C. E. PALMER.
TRACTION WHEEL FENDER.
APPLICATION FILED MAR. 10, 1911.
1,046,104.
Patented Dec. 3, 1912.
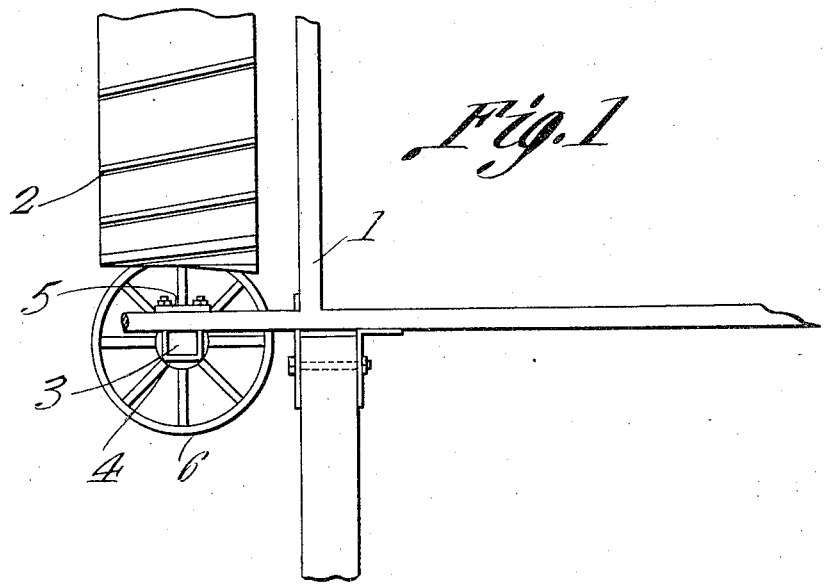
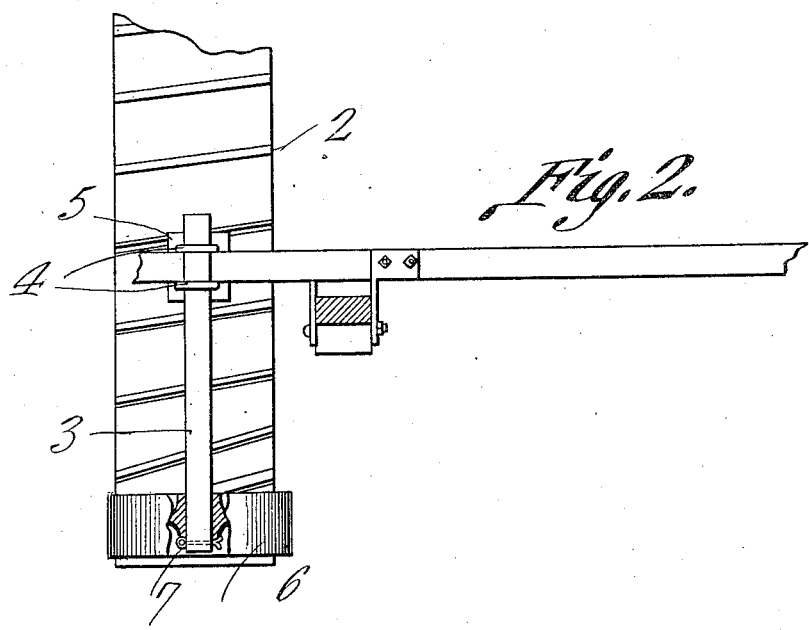
Witnesses
Clayton E. Palmer,
Inventor
by C. A. Snow & Co.
Attorneys

UNITED STATES PATENT OFFICE.

CLAYTON E. PALMER, OF HARVARD, ILLINOIS.

TRACTION-WHEEL FENDER.

1,046,104.

Specification of Letters Patent.

Patented Dec. 3, 1912.

Application filed March 10, 1911. Serial No. 613,487.

*To all whom it may concern:*

Be it known that I, CLAYTON E. PALMER, a citizen of the United States, residing at Harvard, in the county of McHenry and State of Illinois, have invented a new and useful Traction-Wheel Fender, of which the following is a specification.

This invention has relation to fenders for traction wheels especially adapted to be used in conjunction with those employed upon harvesters and it consists in the novel construction and arrangement of its parts as hereinafter shown and described.

The object of the invention is to provide a fender in the form of an attachment especially adapted to be applied to the frame of a corn harvester for preventing the traction or bull wheel of the machine from running over ears of corn lying upon the ground or other obstacles.

With this object in view the fender includes a standard adapted to be applied to the frame of the machine with a wheel loosely journaled at the lower end thereof and is adapted to slide vertically thereon. The wheel of the fender is of greater diameter than the breadth of the tread of the traction wheel and the said standard is adapted to be located upon the frame of the machine in the center of the plane of the traction wheel and therefore the edge portions of the fender wheel will project beyond the planes of the side edges of the traction wheel.

In the accompanying drawings,—Figure 1 is a top plan view of a portion of the frame of a harvester showing the fender applied thereto and located in advance of the traction wheel. Fig. 2 is a front elevation of the same.

As illustrated in the accompanying drawing a portion of the frame of the harvester is shown at 1 and a portion of the traction wheel at 2. The fender consists of a standard or pendant 3 which is adapted to be secured to the frame 1 in advance of the traction wheel 2 by means of U bolts 4 which pass around the upper portion of the said standard and through perforations provided in a clamping plate 5 which is located at the opposite side of that part of the machine in which the said standard 3 is applied thus also permitting the vertical adjustment of the said standard. A fender wheel 6 having a bore extending through the hub thereof is journaled for free rotation at the lower portion of the standard 3, the standard passing through the bore of said hub and may slide longitudinally along the said standard. The said wheel 6 is held upon the lower portion of the standard by means of a cotter pin 7 or equivalent device and when in its lowermost position, the hub of the wheel being seated on the cotter pin, the lower end of the standard lies in a plane above the plane of the lower edge of the said wheel, thus normally preventing the interference or engagement with the ground by the said standard. The wheel 6 is of greater diameter than the breadth of the tread of the traction wheel 2 and consequently the edge portions of the said wheel 6 project beyond the vertical planes of the side edges of the tread of the wheel 2. When in position, the standard 3 is approximately located in the same vertical plane as the median vertical plane of the tread of the traction wheel 2. The standard 3 is so positioned upon the frame 1 that the wheel 6 normally just clears the surface of the ground over which the traction wheel 2 travels, but should the traction wheel 2 enter depressions in the surface of the ground, the lower edge of the rim of the wheel 6, which projects below the hub of the wheel, may come in contact with the same and the said wheel 6 may also move vertically along the said standard 3 should the lower end of the said standard be projected into surface of the soil. By loosening the U-bolts 4 it will be seen that the standards 3 may be adjusted vertically to adjust the position of the wheel 6 above the surface of the soil, thus permitting the wheel to be raised slightly upon the soil being soft, in which event the traction wheel would sink into the soil under the weight of the machine, and permitting the said wheel 6 to be lowered when the soil is hard, in which event the traction wheel would only sink slightly into the soil. This adjustment also permits the standard 3 to be raised to raise the wheel 6 a considerable distance above the surface of the soil when it is not desired to utilize the wheel 6, and the said wheel 6 may be readily lowered at any time to be brought into operation. By such an arrangement it will be seen that as the harvester passes over the ground the wheel 6 will encounter ears of corn or obstacles at the surface of the ground in the path over which the traction wheel 2 must follow and the said ears of corn or obstacles will be pushed to one side by the wheel 6 which is freely journaled and the path of the traction wheel 2 will be clear and therefore it may maintain proper traction with the surface of the ground and at the same time the ears of corn which otherwise would be pressed into and below the surface of the ground are moved to one side and may be subsequently gathered.

Having described the invention what I claim as new and desire to secure by Letters Patent is:—

The combination with the traction wheel and the frame of a machine, of a pendant carried by the frame in advance of the traction wheel and terminating at its lower end above the surface of the soil, a fender wheel of a diameter greater than the width of the tread of the traction wheel having its hub journaled for free rotation on the lower end of the pendant and slidable upward thereon, the lower end of the rim of the fender wheel projecting below the hub so as to ride on the soil and the rim of the fender wheel projecting beyond the planes of the sides of the traction wheel in order to deflect small particles out of the path of the traction wheel, and a stop secured to the lower end of the pendant on which the hub is seatable in order that when the pendant is raised from the soil the fender wheel will be carried upward thereby.

In testimony that I claim the foregoing as my own, I have hereto affixed my signature in the presence of two witnesses.

CLAYTON E. PALMER.

Witnesses:
E. PALMER,
B. F. MANLEY.

---

Copies of this patent may be obtained for five cents each, by addressing the "Commissioner of Patents, Washington, D. C."